April 30, 1963 H. A. TOULMIN, JR 3,087,309

METHOD AND APPARATUS FOR REFRIGERATION

Filed Dec. 22, 1960

INVENTOR

HARRY A. TOULMIN, JR.

BY Toulmin & Toulmin

ATTORNEYS

United States Patent Office 3,087,309

Patented Apr. 30, 1963

3,087,309

METHOD AND APPARATUS FOR REFRIGERATION

Harry A. Toulmin, Jr., Dayton, Ohio, assignor to The Commonwealth Engineering Company of Ohio, Dayton, Ohio Filed Dec. 22, 1960, Ser. No. 78,202
1 Claim. (Cl. 62—3)

The present invention relates to air cooling and air conditioning apparatus, more particularly to an apparatus and method for ventilating and air cooling of homes and office buildings, or an enclosure by using solar energy. This application is a continuation-in-part of application Ser. No. 822,867, filed June 25, 1959, now abandoned.

In many of the warmer climates found throughout the world, personal comfort can be considerably increased by cooling buildings wherein people spend a considerable portion of their time. Such buildings may be homes, offices, factories, or numerous other industrial installations.

Such a cooling process, while highly desirable, is expensive. Thus, it is proposed to provide cooling by utilizing solar energy, which is received in considerable quantities in the warmer regions on the earth.

In the present invention, electrical energy is generated by the solar radiation received by a building. This electrical energy is then passed through a junction of a thermocouple in a particular direction which, according to the Peltier effect, will absorb heat at the junction and thus the junction will be cooled. A plurality of thermocouples are so arranged that the cooled junctions will cool a heat-conductive fluid circulated in heat exchange relationship therewith. This fluid, which may be air, is then circulated through the building using either a central control or an individual control system.

The heat which is rejected at the hot junctions of the thermocouples is carried away by a cooling fluid such as tap water, which is circulated in heat exchange relationship therewith.

A thermocouple is formed by joining two dissimilar metals so as to form a junction. When a current of electricity is passed across such a conductive junction, there is either an evolution or an absorption of heat at the junction. The metals are preferably those having substantially different thermoelectric powers, such as bismuth and antimony. The presence of the two metals in the junction will produce two different potentials resulting from a difference in the free electron density. Accordingly, there will be an exchange of heat into work, or vice versa, produced from the current flowing from one metal to another.

The electricity which is passed through the thermocouples is obtained by converting the solar radiation into electrical energy. This electrical energy is in the form of a direct current which may be passed directly through the thermocouples.

It is therefore the principal object of this invention to provide a novel and improved apparatus and method for cooling enclosures such as buildings.

It is another object of this invention to provide an apparatus and method for using solar radiation to cool buildings.

It is a further object of this invention to provide a simple and economical arrangement for cooling buildings by converting solar energy into electrical energy and by producing a cooling effect with the electrical energy.

Other objects and advantages of this invention will become apparent upon reference to the accompanying description when taken in conjunction with the following drawings, wherein—

Figures 1, 2, 3:
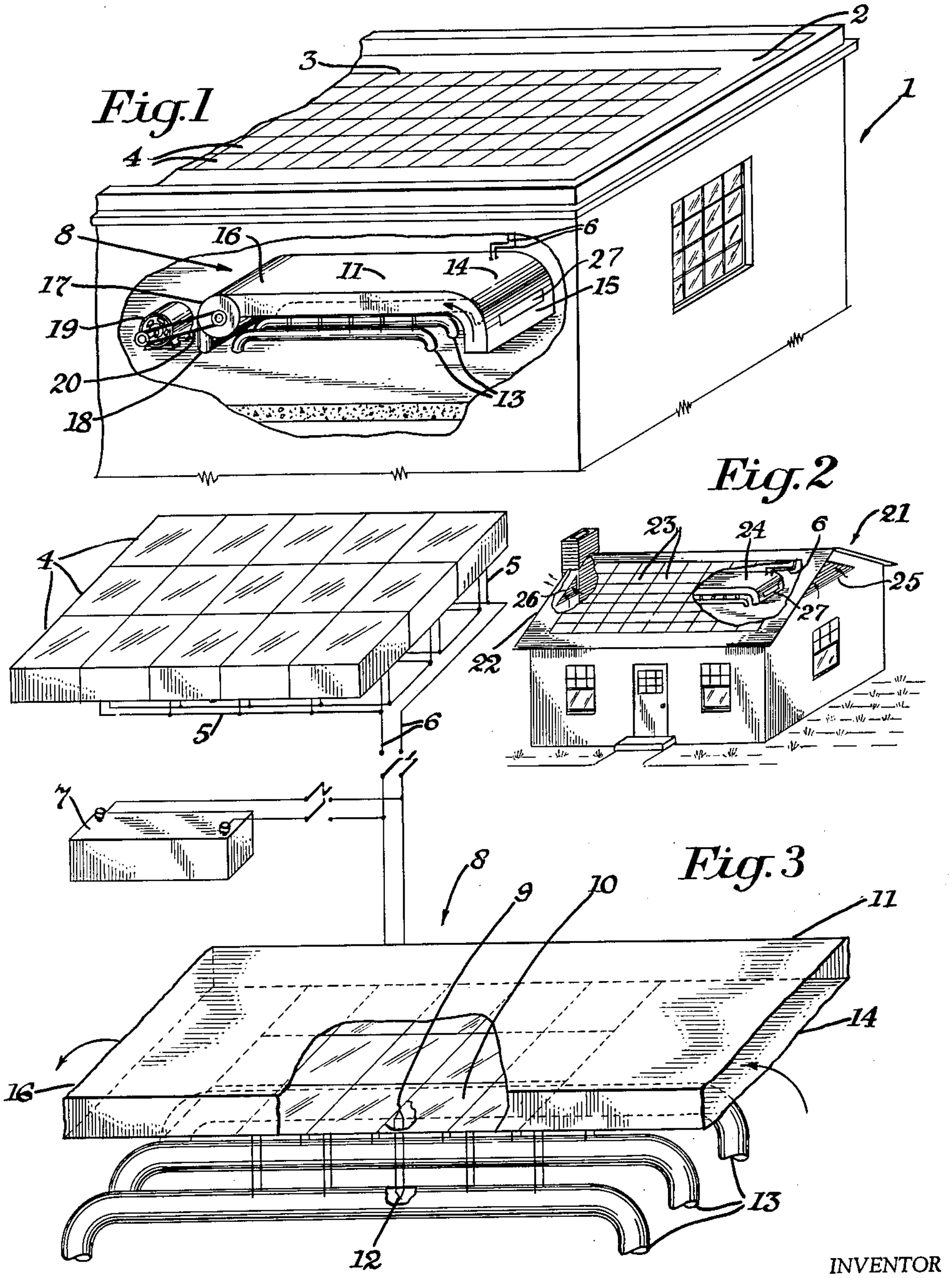
FIGURE 1 is a perspective view of a building in which the apparatus of this invention has been installed, a portion of the building wall being removed to show the installation of the cooling structure on the top floor of the building.
FIGURE 2 is an over-all perspective view showing the arrangement of the solar generators and the cooling and ventilating system when installed in a home.
FIGURE 3 is an over-all perspective view showing the details of construction of the solar generator and the cooling structure.

Turning now to the drawings, wherein like reference symbols indicate the same parts throughout the various views, there is illustrated in FIGURE 1 a building 1 in which the apparatus of this invention has been installed. The building 1 is of the industrial type, such as an office or a factory, and has a substantially flat roof 2. A solar generator 3 is mounted upon the roof and covers substantially the entire area thereof. The presence of the solar generator on the roof will enable the solar generator to be exposed to the sun.

The solar generator 3 is, in effect, a plurality of individual solar generators 4, each of which comprises a silicon strip having a layer of boron thereon. This strip is sensitive to light, and when a plurality of these strips are electrically connected together, such as by the electrical connections 5, each strip can deliver power at the rate of about 30 watts per square yard of surface. The thermocouples are electrically connected in such a manner that the temperature drop across each thermocouple is substantially equal. There are leads 6 extending from the solar generator, through which the electrical energy produced therein is carried off to be used in the cooling apparatus.

A storage battery 7 is connected with the leads so as to store the excess electrical energy developed during those periods of time when the solar generator is exposed to the sun. Thus, sufficient power will be available to operate the cooling system both at night and on sunless days.

The cooling apparatus is generally indicated at 8 and comprises a plurality of thermocouples formed by joining lengths of antimony and bismuth wires so as to form a plurality of junctions. The junctions formed by the connections of the plurality of dissimilar wires will produce alternating hot and cold junctions. Whether the junction is hot or cold depends upon the direction in which the electrical energy is passed through the junction. The cold junctions indicated at 9 are arranged in a cooling surface or panel 10. The cooling panel 10 is formed into a wall of a conduit 11.

The hot junctions indicated at 12 are mounted so as to extend into tubes 13 through which tap water is circulated to absorb the heat evolved by these hot junctions. It has been found that the cooler the water flowing past the hot junctions so as to absorb a greater amount of heat energy, the greater will be the temperature drop provided by the thermocouples. The increased temperature drop will permit a more effective cooling of the air circulated through the conduit 11.

By way of example, it has been found that by using lead telluride and antimony telluride in about 200 thermocouples, a temperature drop of approximately 27° C. in one quart of water per minute can be obtained. Such a temperature drop is sufficient to produce a refrigeration in a household refrigerator. Thus, a sufficient cooling effect will be obtained to cool air to be used in circulation through a building.

The entrance end of the conduit 11, indicated at 14, is joined to a connection 15 which is connected to the ventilating system of the building and through which the air withdrawn from the building is passed into the conduit.

The discharge end of the conduit, indicated at 16, is connected to a blower 17 which discharges the cooled air through a connection 18 which leads into the intake end of the ventilating system of the enclosure. The blower 17 is powered by an electric motor 19 and is drivingly connected thereto by a belt 20.

The ventilating system of the building may be either of the central control type or of the type wherein each of the individual units may be separately controlled.

As may be seen in FIGURE 2, the cooling apparatus of this invention may also be installed in a house such as 21. The house 21, having a sloping roof 22, has the solar generators 23 mounted on each slope of the roof. The cooling apparatus, indicated generally at 24, is mounted in a portion of the attic immediately beneath the roof and is electrically connected to the solar generators in a manner as described above. Ventilating louvers 25 and 26 are provided in the upper wall structure of a building as shown in FIGURE 2 for ventilating air through the building as indicated by the arrows. The operation of this system is similar to that described previously.

In the operation of the present invention, the solar radiation received by the solar generators 4 is directly converted into electrical energy which is then passed through the thermocouples mounted in the cooling apparatus. A heat-conductive fluid such as air as admitted through louvers 25 (note FIG. 2) is circulated in heat-exchange relationship with the cool junctions of the thermocouples to cool the air. The cool air is then circulated through conduits not shown, of the ventilating system of the building and finally discharged through louvers 26. Concurrently with this cooling process, tap water is circulated in heat exchange relationship with the hot junctions so as to absorb the heat evolved therefrom. A louver or adjustable opening 27 is provided in the conduit 11 for the introduction of fresh air into the system as desired.

As an alternative, the warm air withdrawn from the building by the ventilating system may be passed in a heat exchange relationship with the hot junctions so as to remove the heat evolved therefrom. This air may then be circulated in a heat exchange relationship with the cold junctions. This modification will eliminate the necessity for circulating water in the cooling system.

It is pointed out that from three to five times the necessary surface for the solar generators is used, so as to develop an excess of electrical energy, which is then stored in storage batteries.

Thus it can be seen that the present invention provides a simple and effective apparatus and method for the cooling and ventilating of a home or building by using solar radiation. The air conditioning and cooling apparatus is applicable for installation in old or new homes. Maintenance of this system is extremely simple, since there are no moving parts in either the electrical generating system or in the cooling system. Thus, this invention is suitable for use in homes and other installations where constant attention is unavailable and is not desired.

It will be understood that this invention is susceptible to modification in order to adapt to different usages and conditions, and, accordingly, it is desired to comprehend such modifications within this invention as may fall within the scope of the appended claim.

What is claimed is:

In an apparatus for cooling and ventilating a building provided with an air circulating system, a plurality of solar generators mounted in the roof of said building and exposed to the sun rays, means comprising ventilating louvers disposed in the attic of said building for admitting fresh air to said building and exhausting air therefrom, cooling means comprising a plurality of thermocouple junctions disposed in said attic and arranged beneath said solar generators and electrically connected thereto, said cooling means comprising an air duct which is connected to said air circulating system and through which air withdrawn from said building is passed to condition the same, said duct having an adjustable opening therein for admission of said fresh air, said thermocouple junctions being connected so that electrical energy passing therethrough produces a cooling effect at some of said junctions and a warming effect at other of said junctions, conduit means disposed in said attic and adjacent to said air duct for flowing a fluid heat conductive medium in heat exchange relationship with said warming junctions to absorb heat evolved at said junctions, said cooling junctions being arranged in said air duct and said warming junctions being disposed in said conduit means through which said fluid medium passes, and means for circulating air entering said building through said ventilating system.

References Cited in the file of this patent

UNITED STATES PATENTS

| | | |
|---|---|---|
| 389,125 | Weston | Sept. 4, 1888 |
| 420,641 | Dewey | Feb. 4, 1890 |
| 2,221,971 | Haywood | Nov. 19, 1940 |
| 2,682,757 | Borgerd | July 6, 1954 |
| 2,949,014 | Belton | Aug. 16, 1960 |